United States Patent [19]

Scott

[11] Patent Number: 5,219,135

[45] Date of Patent: Jun. 15, 1993

[54] APPARATUS FOR MOUNTING AIR CORE GAUGES

[75] Inventor: Stephen D. Scott, Fenton, Mich.

[73] Assignee: Delco Electronics Corporation, Kokomo, Ind.

[21] Appl. No.: 845,974

[22] Filed: Mar. 4, 1992

[51] Int. Cl.⁵ ............................................. E12B 9/00
[52] U.S. Cl. .................................. 248/27.1; 248/222.3
[58] Field of Search .............. 248/27.1, 27.3, 222.3, 248/904; 362/26

[56] References Cited

U.S. PATENT DOCUMENTS

| | | | |
|---|---|---|---|
| 2,464,778 | 3/1949 | Wagstaff | 248/27.1 |
| 3,868,077 | 2/1975 | Van Tiel et al. | 248/27.1 |
| 4,125,339 | 11/1978 | Pittiner, Sr. et al. | 248/222.3 X |
| 4,410,155 | 10/1983 | Wetterhorn et al. | 248/27.1 |
| 4,872,415 | 10/1989 | Nakadozono et al. | 362/26 X |
| 4,939,406 | 7/1990 | Jeschonneck et al. | 248/27.1 X |
| 5,045,655 | 9/1991 | Ludwig et al. | 248/27.1 X |
| 5,142,274 | 8/1992 | Murphy et al. | 362/23 X |

Primary Examiner—Ramon O. Ramirez
Attorney, Agent, or Firm—Anthony Luke Simon

[57] ABSTRACT

A display apparatus includes a gauge with a first set of feature surfaces and a light pipe into which are integrally molded a second set of feature surfaces, wherein the first and second set of feature surfaces are engaged to integrally secure the gauge to the light pipe, whereby the light pipe performs dual functions of transmitting light and retaining the gauge.

9 Claims, 3 Drawing Sheets

APPARATUS FOR MOUNTING AIR CORE GAUGES

This invention relates to displays and more particularly to display apparatus in which air core gauges and the like are mounted.

BACKGROUND OF THE INVENTION

Many motor vehicles contain one or more gauge displays used for conveying information to the vehicle operator. In some of these gauge displays, the display is backlit, so that light supplied typically from behind the display travels through translucent graphics portions of the display enabling the graphics portions to emit light.

One known method of back-lighting displays is the use of light wave-guides, known as light pipes, which are typically constructed of transparent plastic. If a vehicle instrument cluster includes air core gauges and requires extensive light piping to adequately back-light the display, the gauges are typically mounted to a case housing or a circuit board with a light pipe placed in front of the gauge. In such methods of mounting the air core gauges, several additional fasteners may be necessary to achieve the mounting of the air core gauges, with some systems requiring numerous additional fasteners for each individual gauge.

These above mentioned additional fasteners add cost to display systems because each additional fastener is another part that must be purchased and for which there must be an administrative accounting. What is desired is a way to decrease the cost of the construction of displays such as those used in vehicle instrument clusters and to increase the speed of display assembly.

SUMMARY OF THE PRESENT INVENTION

This invention provides a method and apparatus for mounting gauges in displays that eliminates the need for all additional fasteners formerly necessary for the mounting of displays. By eliminating all additional fasteners, displays according to this invention may be manufactured at a lower cost and assembled with greater ease.

To achieve the advantages herein recited, the structure of this invention comprises (i) a gauge means including a feature means for contacting a mount means and (ii) a light pipe into which is integrally molded the mount means for contacting the feature means in a secure manner thereby holding the gauge means in place without requiring additional fasteners. Advantageously, according to another aspect of this invention, the apparatus herein described may be assembled in a simplified manner by placing the feature means of the gauge means in contact with the mount means in the light pipe and engaging the feature means with the mount means whereby the gauge means is securely fastened into the display.

A more elaborate description of the preferred embodiments of the method and apparatus of this invention are set forth below with reference to the following drawings.

DETAILED DESCRIPTION OF THE INVENTION

Figure 1:
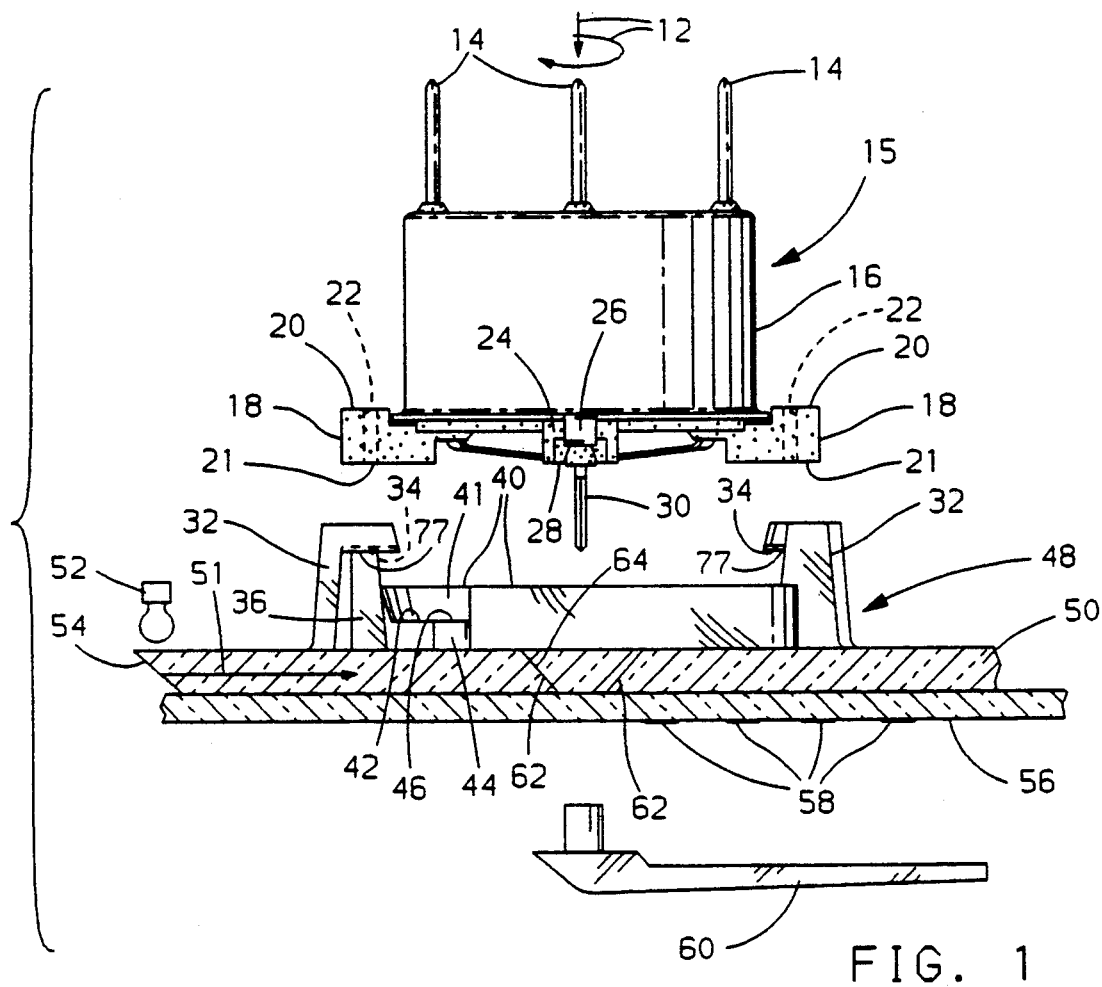
FIGS. 1-5 illustrate an example of the apparatus of this invention with reference to which the method of this invention may also be described.
Figure 2:
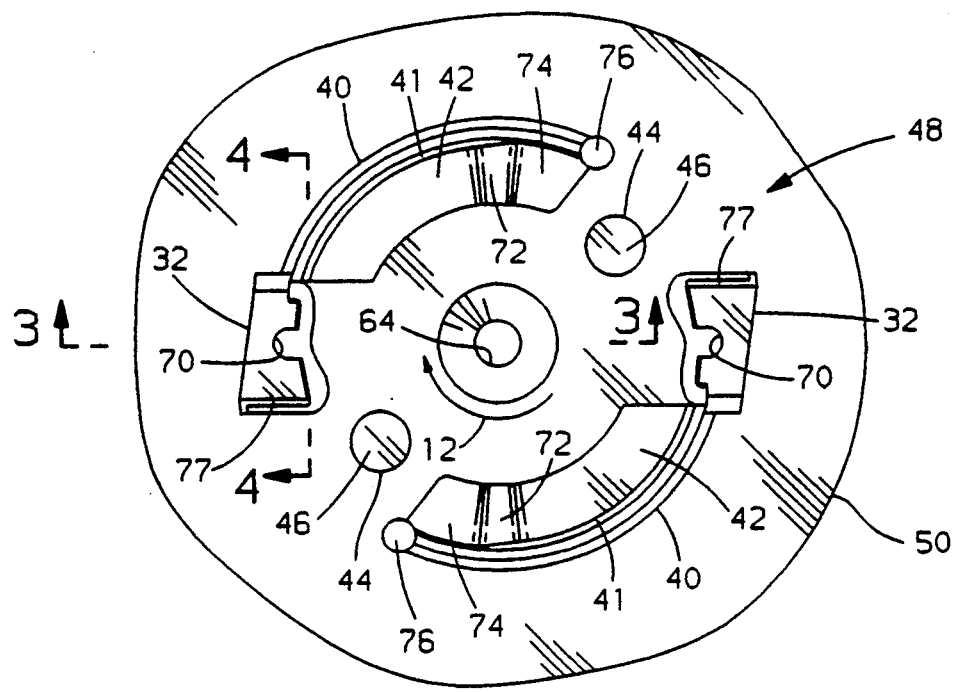
Figure 3:
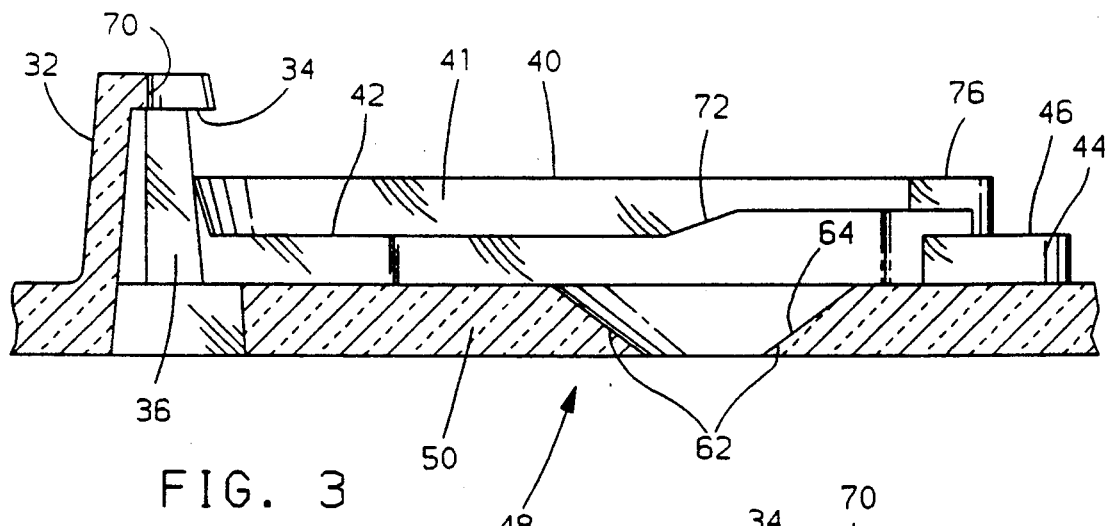
Figure 4:
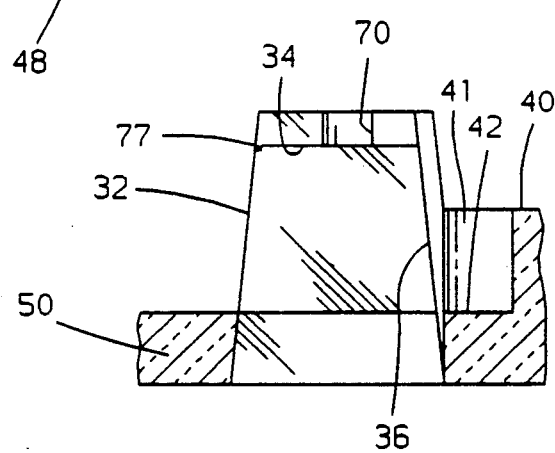
Figure 5:
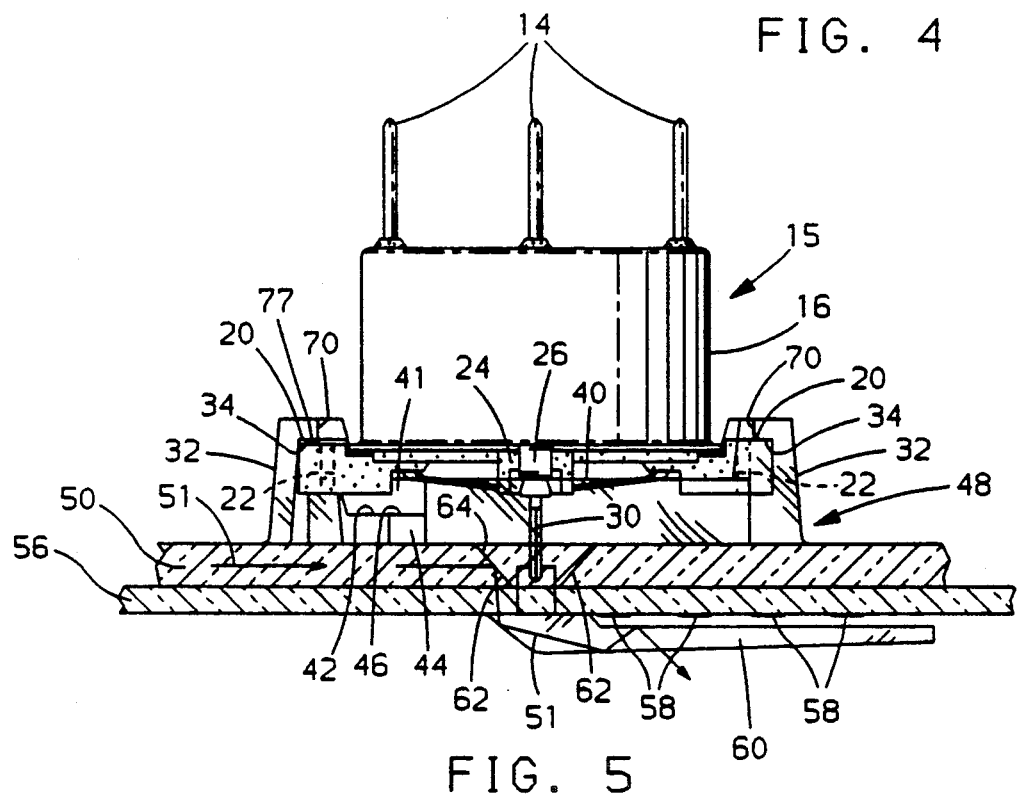

Referring to FIG. 1, a partially exploded view of the apparatus of this invention is shown from a first viewing angle. The gauge means 15 shown is a typical air core gauge (or equivalent) constructed within an aluminum shell 16. Within the aluminum shell 16 is included a bobbin (not shown) around which coils (also not shown) are wound. The coils surround a magnetic rotor (also not shown), which rotates in response to magnetic vectors caused by energization of the coils, thereby rotating spindle 30 to which pointer 60 is fastened.

In the example shown, there are molded to the bobbin (not shown) two primary ears 18 and two secondary ears 24 (only one shown). The primary and secondary ears 18 and 24 hold the bobbin in place within shell 16 with the aid of metal tabs 26 (only one shown) crimped around secondary ears 24. The primary and secondary ears 18 and 24 comprise a feature means with surfaces 28 and 20 for contacting components of the light pipe 48 to securely hold the gauge means 15 in place.

The light pipe 48 has a light transmitting member 50, and integrally molded therein a mount means comprising components 32 and 40. The mount means has surfaces 34 and 74 for contacting the surfaces 20 and 28 of the feature means to securely hold the gauge means in place, without the need for additional fasteners.

More particularly, in the embodiment shown in FIGS. 1-5, the gauge means 15 is secured to the light pipe 48 by placing the gauge means 15 in contact with the mount means and then twisting, as shown by arrows 12. When the gauge means 15 is first placed in the mount means, the surfaces 21 of primary ears 18 are placed on the surfaces 46 of stabilizing posts 44. The surfaces 28 of secondary ears 24 are placed on surfaces 42 of two diametrically opposed guides 40. The gauge means 15 is then twisted relative to the light pipe 48 in the direction of arrow 12 (see FIG. 2). When the gauge means 15 is twisted, the surface 28 of secondary ears 24 rides along slide surfaces 42 of guides 40. The surfaces 41 of guides 40 retain the gauge means 15 in position during the twist process.

As the gauge means 15 is twisted, primary ears 18 rotate into diametrically opposed retainers 32. As primary ears 18 rotate into retainers 32, surfaces 28 of secondary ears 24 slide up ramps 72 in guides 40 and come to rest on friction surfaces 74 of guides 40. The friction surfaces 74 and underside surfaces 34 of the mount means apply opposing forces on surfaces 20 and 28 of the feature means to friction fit the gauge means in place. Engagement of the friction fit between the mount means and the feature means is aided by ramps 72 as follows. Slide surfaces 42 are at a greater vertical distance from underside surfaces 34 than the vertical distance between surfaces 28 and 20. The ramps 72 provide a gradual change between slide surfaces 42 and friction surfaces 74, friction surfaces 74 being at a slightly smaller vertical distance from underside surfaces 34 than the vertical distance between surfaces 28 and 20. When the feature means is engaged to the mount means, the vertical proximity between friction surfaces 74 and underside surfaces 34 cause slight stress on the gauge means bobbin through primary and secondary ears 18 and 24 to thereby provide the friction fit holding the gauge means 15 in place.

Posts 76 in guides 40 and surfaces 36 in retainers 32 act as stops against primary and secondary ears 18 and 24 to prevent the gauge means 15 from being twisted too far, rotatably locating the gauge means 15. Ribs 77 located on the underside surface 34 of each retainer 32 provide the friction fit with surface 20 of ear 18. Once ear 20 is engaged in retainer 32, ribs 77 prevent the gauge 15 from rotating back out of the mount from vibration, etc.

In the event that part of the mount means does not function properly to hold the gauge means in place, two slots 70 may be placed in the tops of retainers 32. The slots 70 are aligned with holes 22 in primary ears 18 when the feature means is properly engaged with the mount means. As a back-up attachment means, two screws (not shown) may be installed through slots 70 and into holes 22 to hold the gauge means in place. This, however, is normally not necessary.

Mounted on the front surface of the light transmitting member 50 of the light pipe 48 is a generally translucent sheet 56, parts of which may be masked and filtered with applique graphics 58 forming part of a display viewed by an observer.

When the gauge means 15 is mounted in the assembly, the spindle 30 is inserted through hole 64 in the light pipe 48 and through a hole (not shown) in the translucent sheet 56. A pointer 60 is attached to spindle 30 at the front of the display, so that pointer 60 moves along graphics 58 as the spindle 30 is rotated by the gauge means 15.

In the backlit display shown, light is provided by a light source 52, such as one or more incandescent bulbs. Light rays 51 may be transmitted into the light transmitting member 50 and reflected off of a surface 54 within light transmitting member 50 so that they travel along the member. Around hole 64, reflecting surfaces 62 reflect the light rays 51 toward the pointer 60. The pointer 60 receives the light and has internal surfaces which reflect the light so that the pointer appears lit to a viewer of the display. Various other reflecting surfaces may be molded into the light pipe 48 so that the light rays are reflected to other parts of the display which then appear lit. Such implementations are well known to those skilled in the art and will not be set forth in further detail herein.

Figure 6:
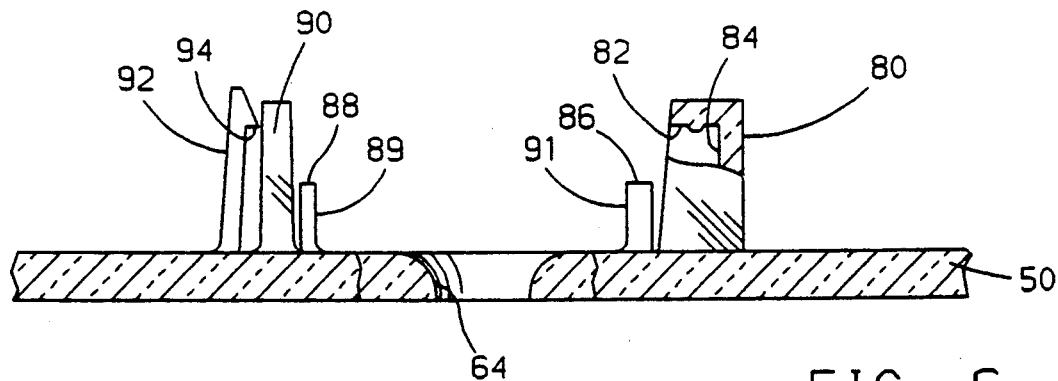
FIGS. 6-8 illustrate a second example of the apparatus of this invention.
Figure 7:
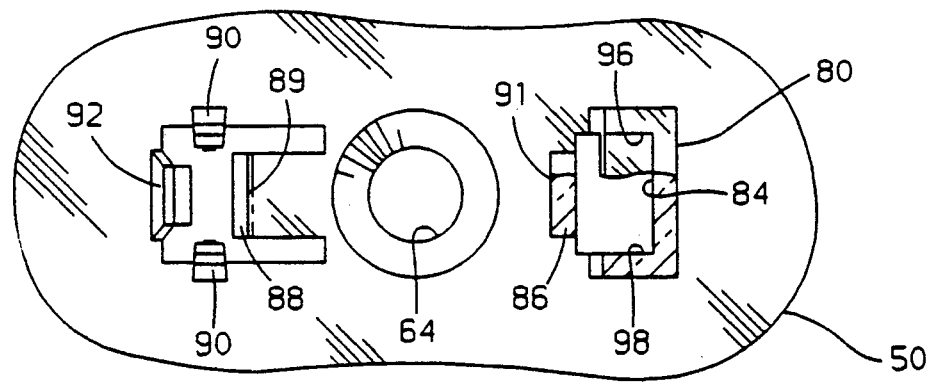
Figure 8:
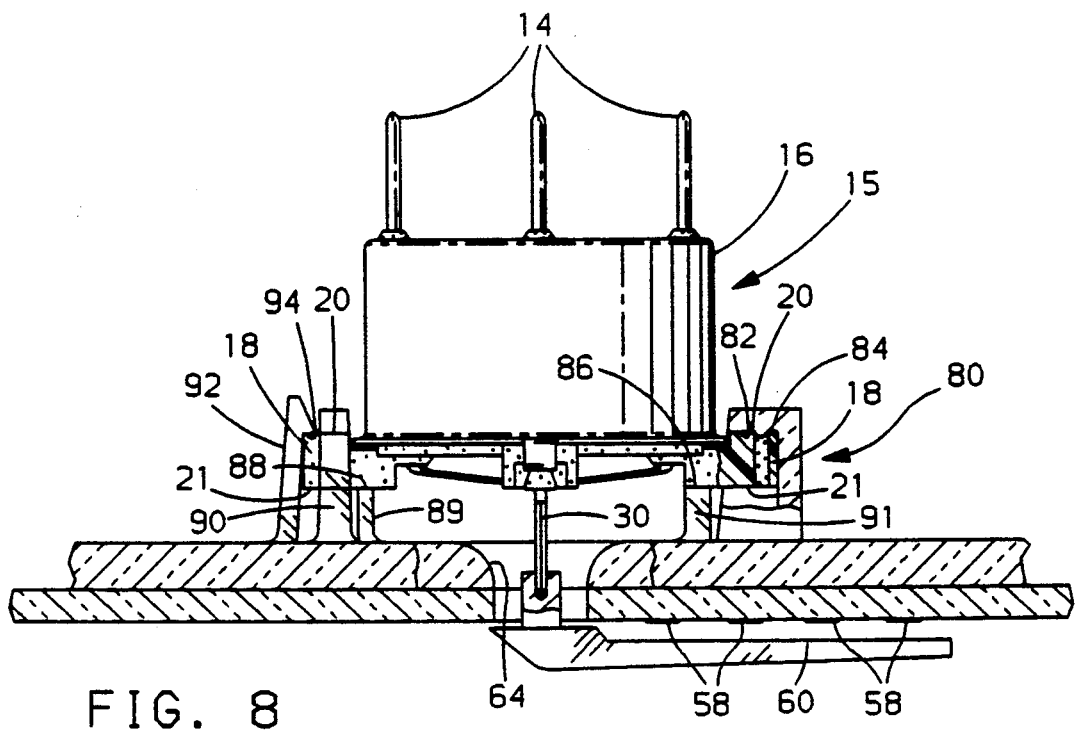

In the above described embodiment, the gauge means 15 is placed in the mount means, and twisted relative to the mount means to engage the friction fit between the feature means and the mount means which secures the gauge means to the light pipe, thereby mounting the gauge means in the display. In a second embodiment of this invention shown in FIGS. 5–7, the gauge means 15 is mounted to the display by engaging the feature means of the gauge with a different type of mount means. The mount means shown includes a retainer 80 into which part of the feature means is inserted. The feature means and mount means are then engaged by snapping the other part of the feature means into a cantilever snap finger 92.

More particularly, the mount means comprises retainer 80 having inner top surface 82 and three inner side surfaces 84, 96 and 98, stops 89 and 91 having surfaces 88 and 86, guides 90 and cantilever snap finger 92. In assembly, one of the primary ears 18 is placed in retainer 80, which locates the ear 18 via inner surfaces 84, 96 and 98. The other primary ear 18 is then snapped in-between guides 90 by cantilever snap finger 92 having retaining surface 94 which contacts surface 20 of the ear 18. The bottom surfaces 21 of the primary ears 18 rest on surfaces 88 and 86 of stops 89 and 91 to provide location of the gauge means 15 in a first direction.

Stop 89 has a limited amount of give and provides a spring force to tightly hold ear 18 in place against retaining surface 94 of cantilever snap finger 92. Surfaces 82 and 86 provide a force fit for the ear 18 in retainer 80. Surface 94 of cantilever snap finger 92 and surface 82 of retainer 80 provide location of the gauge means 15 in the direction opposite the first direction. Likewise, cantilever snap finger 92, guides 90 and retainer 80 provide location of the gauge means 15 in the remaining dimensions.

Retainer 80 may be provided with a protruding spherical dimple in surface 82 to act together with hole 22 in primary ear 18 to locate the primary ear 18 within retainer 80.

Either of the above implementations may be used and the completed assembly may be mounted in a housing (not shown), which is typically molded from plastic. The housing may be provided with a clear plastic cover to keep dust out of the display. The entire display may then be installed into a motor vehicle. Electrical connections are made with terminals 14 of gauge means 15, through which power is supplied to the display in a known manner. Methods of mounting assemblies like the type shown in FIGS. 4 and 7 into housings and then into motor vehicles are well known to those skilled in the art.

The above described embodiments of this invention are example implementations and are not meant to be limiting on this invention. Various other improvements and modifications to this invention may occur to those skilled in the art and fall within the scope of this invention as defined below.

The embodiments of the invention in which an exclusive property or privilege is claimed are defined as follows:

1. A display apparatus, comprising:
   gauge means for displaying information including a feature means for contacting a mount means; and
   a light pipe into which is integrally molded the mount means for contacting the feature means in a secure manner thereby holding the gauge means in place without requiring additional fasteners, wherein
   the feature means includes a first set of surfaces on the air core gauge that are placed in contact with the mount means, and wherein
   the mount means includes a second set of surfaces that are in contact with the first set of surfaces on the air core gauge in a manner to cause a friction fit between the air core gauge and the mount means, whereby the air core gauge is secured to the mount means.

2. The apparatus set forth in claim 1 wherein the mount means comprises a pair of guides with a pair of slide surfaces, a pair of ramps and a pair of friction surfaces, the mount means also comprising a pair of retainers with a pair of underside surfaces, the air core gauge comprises a primary set of ears and a secondary set of ears, wherein the secondary set or ears are placed in contact with the pair of slide surfaces and the air core gauge is rotated with respect to the light pipe so that the primary set of ears rotate into the retainers and the secondary set of ears slide up the pair of ramps and rest on the pair of friction surfaces, wherein a friction fit is achieved between the underside surfaces engaged with the primary set of ears and the friction surfaces engaged with the secondary set of ears.

3. The apparatus set forth in claim 2 also comprising a set of stabilizing posts that contact the primary set of ears before the air core gauge is rotated to stabilize the air core gauge with respect to the light pipe.

4. The apparatus set forth in claim 2 wherein the pair of retainers comprise a pair of stops against which the primary ears abut after the feature means and mount means are engaged to rotatably locate the air core gauge.

5. The apparatus set forth in claim 2 wherein the pair of guides comprise a pair of stops against which the secondary ears abut after the feature means and mount means are engaged to rotatably locate the air core gauge.

6. The apparatus set forth in claim 2, wherein the retainers are diametrically opposed.

7. The apparatus set forth in claim 2 wherein the guides are diametrically opposed.

8. A display apparatus, comprising:
  gauge means for displaying information including a feature means for contacting a mount means; and
  a light pipe into which is integrally molded the mount means for contacting the feature means in a secure manner thereby holding the gauge means in place without requiring additional fasteners, wherein
  the feature means includes a first set of surfaces on the air core gauge that are placed in contact with the mount means, and wherein
  the mount means includes a second set of surfaces that are in contact with the first set of surfaces on the air core gauge in a manner to cause a snap fit between the air core gauge and the mount means, whereby the air core gauge is secured to the mount means.

9. The apparatus set forth in claim 8, wherein the mount means comprises a retainer and a cantilever snap finger and the feature means comprises a pair of ears, wherein one ear is placed into the retainer and the other ear is snapped into the cantilever snap finger thereby engaging the feature means and the mount means and securing the air core gauge to the light pipe.

* * * * *